United States Patent
Thumfart et al.

(10) Patent No.: US 8,978,010 B1
(45) Date of Patent: Mar. 10, 2015

(54) PRUNING COMPILATION DEPENDENCY GRAPHS

(71) Applicants: Andreas Thumfart, Heidelberg (DE); Norbert Kuck, Karlsruhe (DE)

(72) Inventors: Andreas Thumfart, Heidelberg (DE); Norbert Kuck, Karlsruhe (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 14/133,182

(22) Filed: Dec. 18, 2013

(51) Int. Cl.
*G06F 9/44* (2006.01)
*G06F 9/45* (2006.01)

(52) U.S. Cl.
CPC ... *G06F 8/73* (2013.01); *G06F 8/48* (2013.01)
USPC .......................................................... 717/123

(58) Field of Classification Search
CPC .......................................................... G06F 8/433
USPC .......................................................... 717/123
See application file for complete search history.

(56) References Cited

U.S. PATENT DOCUMENTS

| | | | |
|---|---|---|---|
| 4,558,413 A * | 12/1985 | Schmidt et al. | 717/170 |
| 5,428,780 A | 6/1995 | England et al. | |
| 7,039,923 B2 * | 5/2006 | Kumar et al. | 719/331 |
| 7,493,320 B2 | 2/2009 | Canright et al. | |
| 7,590,639 B1 | 9/2009 | Ivanova et al. | |
| 7,698,712 B2 | 4/2010 | Schreter | |
| 7,805,440 B2 | 9/2010 | Farrell et al. | |
| 7,831,526 B1 | 11/2010 | Crawford et al. | |
| 7,978,629 B2 | 7/2011 | Resende et al. | |
| 8,239,404 B2 * | 8/2012 | Zhou et al. | 707/769 |
| 8,275,645 B2 | 9/2012 | Kind | |
| 8,346,633 B2 | 1/2013 | Harrer | |
| 8,502,823 B2 | 8/2013 | Moreno | |
| 8,539,492 B1 | 9/2013 | Beckford et al. | |
| 2004/0025152 A1 * | 2/2004 | Ishizaki et al. | 717/159 |
| 2007/0162903 A1 * | 7/2007 | Babb et al. | 717/154 |
| 2009/0006148 A1 | 1/2009 | Bacalski et al. | |
| 2009/0133006 A1 * | 5/2009 | Cheung | 717/144 |
| 2009/0254892 A1 * | 10/2009 | Yamashita | 717/146 |
| 2010/0333109 A1 | 12/2010 | Milnor | |
| 2012/0191843 A1 * | 7/2012 | Ding et al. | 709/224 |
| 2013/0117752 A1 | 5/2013 | Li et al. | |

OTHER PUBLICATIONS

"Dependency Graph," *Wikipedia*, visited Nov. 25, 2013, 3 pages.
"Topological Sorting," *Wikipedia*, visited Nov. 25, 2013, 5 pages.
"Topologische Sortierung," Wikipedia, visited Dec. 4, 2013, 16 pages. [German].
"Strongly connected component," *Wikipedia*, visited Nov. 25, 2013, 3 pages.
"Tarjan's strongly connected components algorithm," *Wikipedia*, visited Nov. 25, 2013, 4 pages.

(Continued)

*Primary Examiner* — Philip Wang
(74) *Attorney, Agent, or Firm* — Klarquist Sparkman, LLP

(57) ABSTRACT

Technologies are disclosed for pruning a dependency graph representing source artifacts compilable by a plurality of compilers. The dependency graph can include strongly connected components represented as a directed acyclic graph. During compilation of the source artifacts, it can be discovered that some source artifacts did not need to be compiled, and associated nodes in the dependency graph can be pruned. Pruning can result in removal of nodes for source artifacts that are yet to be compiled, and compilation for source artifacts associated with such nodes in the dependency graph can be avoided.

19 Claims, 10 Drawing Sheets

(56) References Cited

OTHER PUBLICATIONS

Callahan, "Structural/Interval Analysis + Dataflow Analysis Take II," http://www.cs.cmu.edu/afs/cs/academic/class/15745-s05/www/lectures/t1t2.pdf, Copyright 2005, 73 pages.

"Layered Graph Drawing (The Sugiyama Method)", DECO}Han Wordpress site, Sep. 28, 2011, 2 pages.

"Layered Graph Drawing (The Sugiyama Method)," slides, http://sydney.edu.au/engineering/it/~shhong/fab.pdf, Sep. 28, 2011, 9 pages.

"Layered graph drawing," *Wikipedia*, visited Nov. 26, 2013, 5 pages.

"Exposing and Consuming Data—Architecture," Week 4, openSAP, visited Nov. 26, 2013, 35 pages.

Cormen et al., "Elementary Graph Algorithms," *Introduction to Algorithms*, Chapter 23, Copyright 1990 by the Massachusetts Institute of Technology, 36 pages.

* cited by examiner

500

600

800

PRUNING COMPILATION DEPENDENCY GRAPHS

BACKGROUND

Software development is an ongoing task that requires management of a variety of complex information. In practice, software development involves writing and/or modifying a number of source objects representing various aspects of the software. The source objects are ultimately transformed into runtime objects by a process called "compilation" that transforms the source objects into a form that can be used for execution of the software at runtime.

During the development and testing process, it is usual to compile the source objects numerous times. Due to the complex nature of any significant software project, the software is typically divided into parts that can be separately modified, managed, and reused. One advantage to dividing the software is that changes in one part of the software may not affect another part; therefore, time can be saved by not re-compiling the unaffected part.

However, determining which parts are unaffected turns out to be a task in itself. Development tools can track dependencies between different parts of the software. For example, a change to a software definition in a first part of the software may affect a second part of the software. Therefore, a change to the first part may require compilation of the second part, even though no direct changes were made to the second part.

In practical terms, such dependencies can become quite complex as the size of a software project grows beyond the ability of any single developer to fully understand the dependencies.

Thus, there is a need for technologies to address complex dependency scenarios.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

In one embodiment, a method implemented at least in part by a computing system comprises receiving a dependency graph representation of dependencies for source artifacts, wherein the source artifacts are represented in the dependency graph representation as source artifact nodes, and the source artifact nodes are grouped into strongly connected components associated with respective compilers appropriate for compiling the represented source artifacts therein; receiving an indication that one or more of the source artifacts represented in the dependency graph representation are unnecessary to compile; pruning one or more source artifact nodes in the dependency graph representation for the one or more of the source artifacts indicated as unnecessary to compile; and after the pruning, updating the dependency graph representation.

In another embodiment, a system comprises a graph representation of source artifacts, wherein the graph representation is divided into a plurality of strongly connected components associated with respective compilers, and one or more source artifact nodes of the graph representation are designated as members of a start set; a pruning engine configured to receive an indication that one or more source artifacts represented in the graph representation are unnecessary to compile, wherein the pruning engine is configured to prune one or more source artifact nodes of the graph representation associated with the source artifacts that are unnecessary to compile and prune one or more strongly connected components isolated from the start set by having pruned the one or more source artifact nodes; and an activation framework configured to examine the graph representation and determine a next group of strongly connected components to submit to a given compiler out of the compilers, wherein the activation framework avoids compilation of source artifacts associated with strongly connected components pruned by the pruning engine.

In another embodiment, one or more computer-readable storage media comprises computer-executable instructions causing a computing system to perform a method comprising receiving a dependency graph representation of a plurality of source artifacts indicated as compilable by a given compiler out of a plurality of respective compilers; separating the dependency graph representation into strongly connected components, wherein the strongly connected components are represented as a directed acyclic graph, and a given strongly connected component out of the strongly connected components comprises source artifact nodes representing source artifacts compilable by a single compiler; based on a topological sort of the strongly connected components, choosing one or more of the strongly connected components to submit to a compiler out of the plurality of compilers; receiving an indication that one or more of the source artifacts of the chosen one or more of the strongly connected components are unnecessary to compile; pruning the source artifacts unnecessary to compile from the dependency graph representation; based on pruning the source artifacts, identifying one or more isolated strongly connected components; and responsive to identifying the one or more isolated strongly connected components, pruning the one or more isolated strongly connected components from the dependency graph representation, whereby compilation of source artifacts associated with the one or more isolated strongly connected components is avoided.

DETAILED DESCRIPTION

Example 1

Overview

The technologies described herein can be used for a variety of compilation dependency graph pruning scenarios, and adoption of the technologies can provide improved techniques for software development.

During the compilation process, it can be discovered that certain source artifacts did not need to be compiled (e.g., because compilation had no observable effect). This knowledge can be used to prune the dependency graph, and such pruning can lead to isolation of components within the graph, indicating that compilation of other source artifacts is not necessary and can indeed be avoided.

The technologies can be helpful for those wishing to avoid expending unnecessary computing resources during the development process. Beneficiaries can also include end users because they enjoy a more rapid development cycle.

Various other features can be implemented and combined as described herein.

Example 2

Example System Implementing Compilation Dependency Graph Pruning

Figure 1:
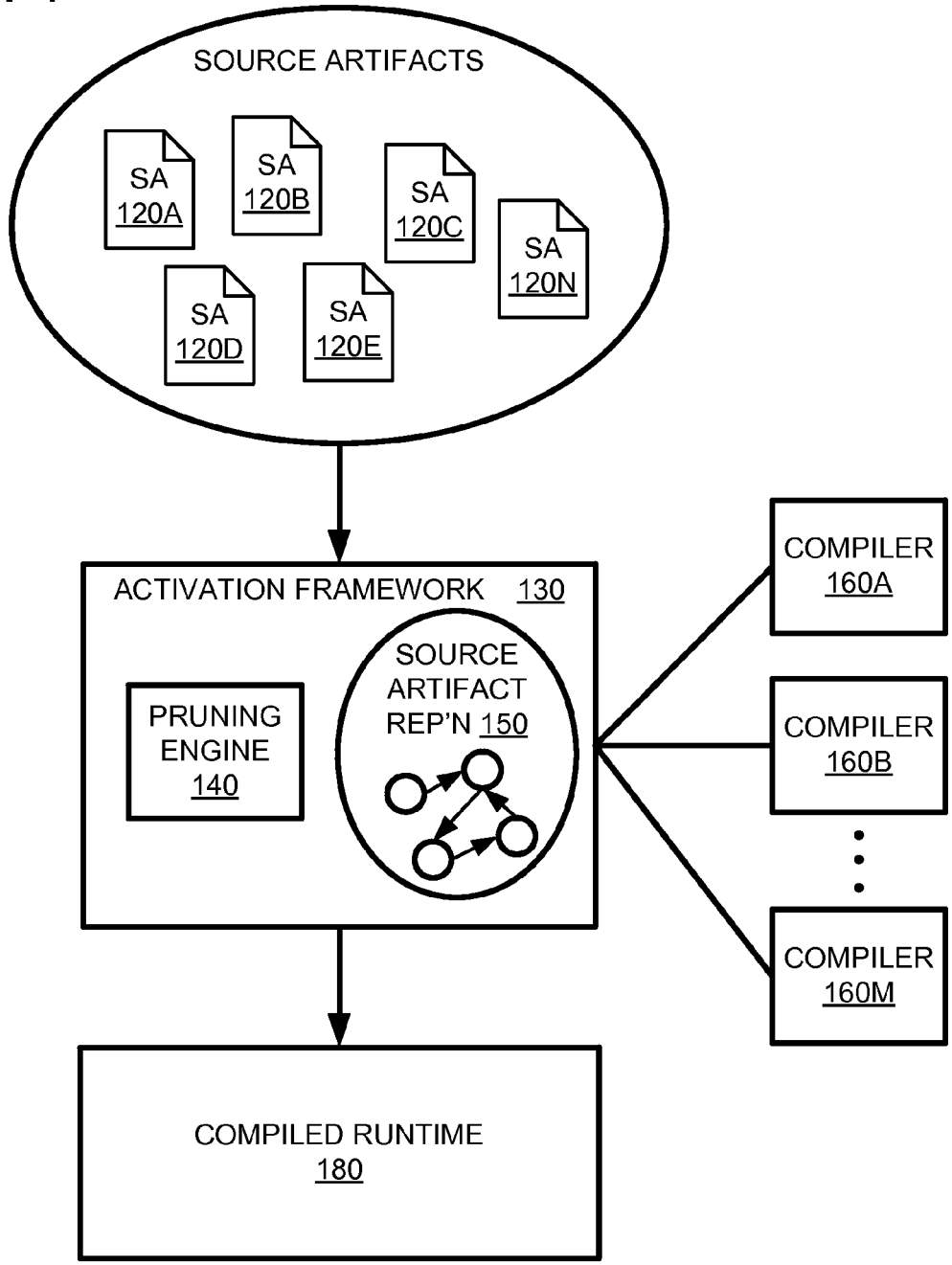
FIG. 1 is a block diagram of an example system implementing compilation dependency graph pruning.

FIG. 1 is an illustrative overview of an example system 100 implementing compilation dependency graph pruning. In FIG. 1, an activation framework 130 accepts a plurality of source artifacts 120A-N as input and generates a compiled runtime 180 (e.g., or runtime objects for such a runtime) with assistance from the compilers 160A-M. As described herein, the source artifacts 120A-N can be associated with the compilers 160A-M (e.g., a given source artifact out of the artifacts 120A-N can be indicated as compilable by a particular one of the compilers 160A-M).

In the example, the framework 130 includes a pruning engine 140 described in further detail herein. A representation 150 of the source artifacts 120A-N can take the form of a dependency graph representation of dependencies for the source artifacts 120A-N.

In practice, the systems shown herein, such as system 100 can vary in complexity, with different functionality, components of differing complexity, and the like. For example, in practice, an activation framework 130 can comprise a variety of other functionality not shown to address activation of design time objects in the source artifacts 120A-N.

Although various components of the systems herein are shown as a single component, in practice, the boundaries between components can be changed. For example, in practice, the framework 130 can be implemented across one or more machines, virtual or physical. Functionality can be distributed among such machines as desired. Additional features relating to security and redundancy can also be included.

The system 100, any of the other systems described herein, and subsets of such systems can be implemented in conjunction with any of the hardware components described herein, such as the computing systems described below (e.g., processing units, memory, and the like). In any of the examples herein, the inputs, outputs, associations, frameworks, tools, engines, source artifacts, and compiled runtime can be stored in one or more computer-readable storage media or computer-readable storage devices. The technologies described herein can be generic to the specifics of operating systems or hardware and can be applied in any variety of environments to take advantage of the described features.

Example 3

Example Method Implementing Compilation Dependency Graph Pruning

Figure 2:
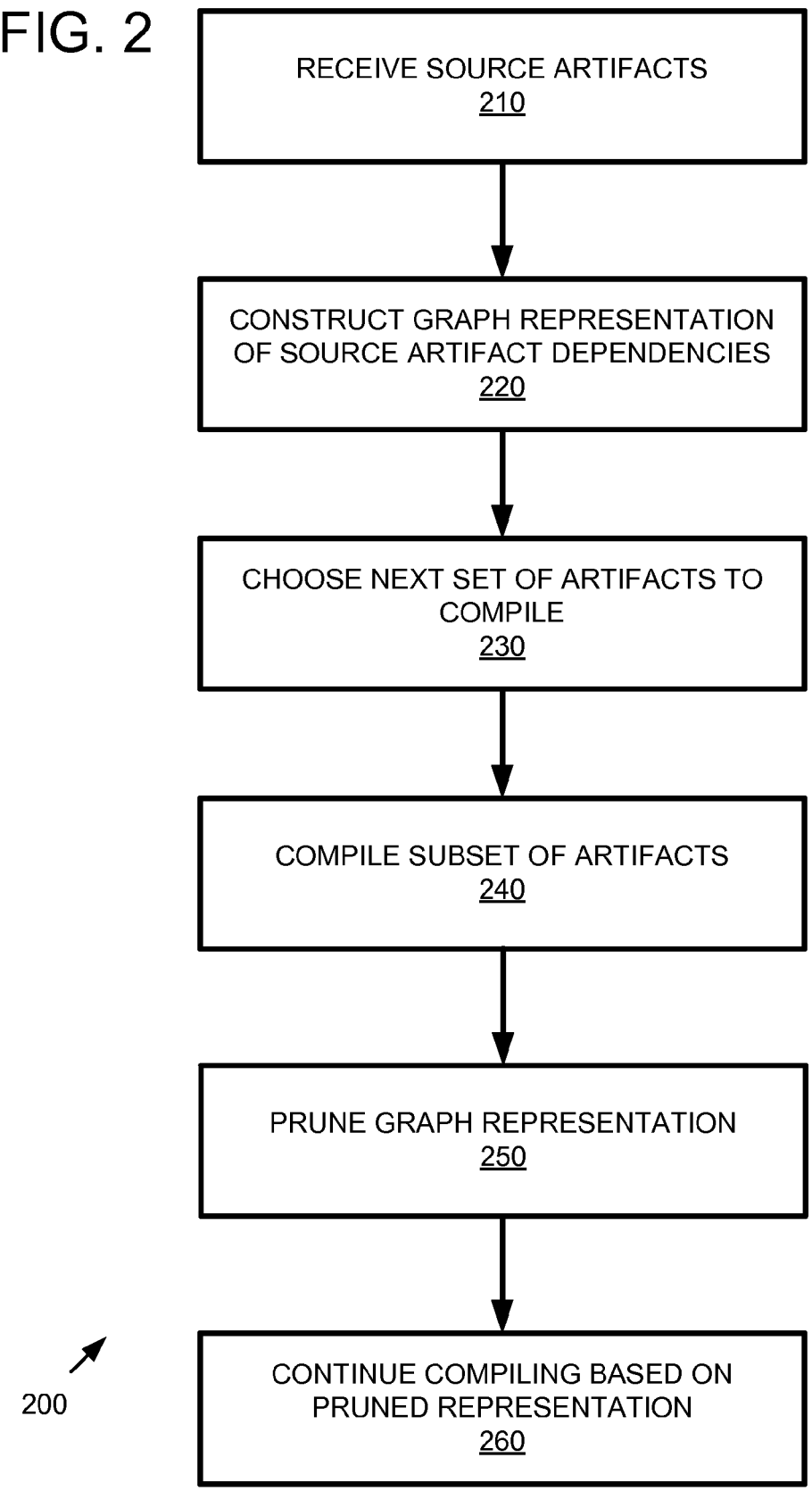
FIG. 2 is a flowchart of an example method of implementing compilation dependency graph pruning.

FIG. 2 is a flowchart of an example method 200 of implementing compilation dependency graph pruning and can be implemented, for example, in the system shown in FIG. 1. As with the other methods described herein, the order of the acts can be changed while still implementing the described technologies.

At 210, a plurality of source artifacts (e.g., source artifacts 120A-N) are received.

At 220, a graph representation of dependencies for the source artifacts is constructed. As described herein, source artifact nodes representing the source artifacts can be grouped into strongly connected components. A given strongly connected component can be associated with one out of a plurality of compilers according to the source artifacts represented.

At 230, the next set of source artifacts to compile is chosen. As described herein, a topological sort of the dependency graph representation can be performed to assist in determining which group or groups of source artifacts are to be compiled next. For example, connected components (e.g., remaining roots with no dependencies indicated by incoming edges) for a given compiler can be added to a result set until a connected component for a different compiler is encountered. The source artifacts in the result set can be used as the subset to be submitted for compilation.

At 240, a subset of the source artifacts is submitted for compilation. As a result of the compilation or attempt at compilation, an indication can be received (e.g., from the compiler) that one or more of the source artifacts (e.g., submitted for compilation) did not need to be compiled (e.g., compilation of the source artifact was unnecessary).

At 250, the graph representation of the source artifacts can be pruned based on the indication that one or more of the source artifacts did not need to be compiled (e.g., by pruning nodes for such artifacts). As described herein, pruning can eventually result in removal of nodes representing source artifacts that have or have not yet been submitted for compilation. Because a dependency has been removed, the representation indicates that compilation is not necessary, and computing resources are saved if the source artifacts have not yet been compiled.

At 260, compilation can continue based on the pruned representation of the source artifacts. Thus, the process can be iterative, repeating 230-250 until compilation is complete. In practice, the compilation can proceed by submitting different groups (e.g., strongly connected components) of source artifacts to different compilers as described herein.

The method 200 and any of the other methods described herein can be performed by computer-executable instructions (e.g., causing a computing system to perform the method) stored in one or more computer-readable media (e.g., storage or other tangible media) or stored in one or more computer-readable storage devices.

Example 4

Example Source Artifacts

In any of the examples herein, a source artifact can take a variety of forms. Such artifacts can be any file or other information that is compilable to an executable runtime. In practice, such artifacts comprise source (e.g., design time) objects and can include source code, procedures, functions, data structures, types, descriptions of database tables, descriptions of views, descriptions of indexes, and the like. The technologies do not depend on any particular type of source artifact and can be used in any of a variety of scenarios in which there are dependencies among the source artifacts.

In practice, source objects can be grouped together into related files (e.g., source code files or other files with source objects). Such objects can be related by function or layer. For example, for software that is customizable by third parties and ultimate users, such layers can include a standard layer, a third-party layer of extensions, and a customer layer of extensions. When compilation is performed, the dependencies can become quite complex, but the technologies herein can be used to avoid unnecessary compilation in any of a variety of scenarios.

Example 5

Example Activation Framework

In any of the examples herein, an activation framework can be provided by which compilation can take place. Such a framework can accept plug-ins that provide the information necessary to compile and manage a variety of source artifacts. The activation framework can then orchestrate generation of a compiled runtime from the source artifacts.

As described herein, an activation framework can include a variety of dependency management functionality, including determining in what order source artifacts are to be compiled and the described pruning functionality, which can avoid compilation of some source artifacts that are initially indicated as required to be compiled due to detected dependencies.

Design time objects can be stored in a repository. The activation framework can apply changes made to the design time objects to runtime objects. During activation, several objects are activated in one step. Activation cannot be done in arbitrary order. For example, if a design time object representing a database table is created and a procedure that selects from the table are activated at the same time, the table should be created first. The repository can ensure that if an object $O_2$ depends on a new or modified object $O_1$, $O_1$ is activated before $O_2$. The general approach to deal with dependencies is to topologically sort the dependency graph of objects.

The framework can attempt to keep objects of the same compiler adjacent in the topological order so that separate submissions to the compiler are minimized for performance reasons.

Example 6

Example Compilers and Compiled Runtimes

In any of the examples herein, a compiler can take any of a variety of forms. Although the terms "compiler" and "compilation" are used, any software capable of generating a runtime artifact for a compiled runtime based on a source artifact can serve as a compiler for the technologies described herein, even if executable code is not generated. A compiler is sometimes called a "generator" or "activation plug-in" herein, and compilation is sometimes called "generate" or "calling the generate method."

Runtime artifacts can include executable code, scripts, files, database tables, views, indexes, and the like.

In practice, the overall compilation process can include further actions such as linking, optimizing, and the like.

Example 7

Example Dependency Graph Representation

In any of the examples herein, a dependency graph representation can represent dependencies for source artifacts. Typically, source artifacts are represented in the dependency graph representation as source artifact nodes (e.g., vertices), and dependencies between the artifacts are represented as directed edges (e.g., a first node representing a first source artifact points to a second node representing a second source artifact that depends on the first source artifact). The representation thus represents dependencies among the represented source artifacts. Such a dependency typically indicates that a source artifact B that depends on another source artifact A must be compiled after the artifact on which it depends (e.g., compilation of the depended-on source artifact A is a prerequisite for compilation of the artifact B that depends on the depended-on artifact). For example, the compiled runtime representation of the depended-on source artifact A may be used during the compilation of the source artifact B. In such a case, compilation of A is said to "affect the compilation of B."

In practice, it is typical that a user (e.g., developer, tester, etc.) presents a set of source artifacts (e.g., the "start set") to be compiled to the activation framework. The objective of the activation framework is then to make sure that all source artifacts in the start set are compiled, and that all source artifacts that may (e.g., because of dependencies) possibly be affected by the compilation are also compiled.

In simple cases, following the dependencies merely requires a topological sort of the nodes and traversal of the graph. However, in practice, there can be cycles in the graph (e.g., at the node level), so a more sophisticated approach to processing the representation can be followed as described herein.

Because different compilers can be appropriate for compiling different of the source artifacts, a node in the representation can be associated with a particular compiler (e.g., via a compiler identifier of the like).

In practice, compilers may impose restriction on the occurrence of cycles in the dependency graph. An example for a typically requirement is that all source artifacts involved in a dependency cycle must be compiled by the same compiler in a single invocation. In graph theory, the phenomenon of "all nodes belonging to a cycle" is more formally defined as a strongly connected component.

As described herein, the source artifact nodes in a representation can be grouped into strongly connected components. Various techniques, such as Tarjan's algorithm or variants on it can be used to find the strongly connected components. Such a technique can have the side effect of providing a topological sort of the strongly connected components that can be useful when finding the next group of artifacts to compile. After grouping, the representation takes the form of a directed acyclic graph of strongly connected components. Edges between the nodes can be used as edges between the strongly connected components as shown herein. An edge from one strongly connected component to another can be called an "incoming external edge" as described herein.

In practice, the members (e.g., source artifacts) of a strongly connected component can be compiled (e.g., are indicated as to be compiled) by a single compiler. The strongly connected component can be associated with the particular compiler.

Example 8

Example Unnecessary-to-Compile Source Artifacts

In any of the examples herein, an indication that one or more source artifacts are unnecessary to compile can be received. Such an indication can be received from a compiler as a result of performing the compilation process (e.g., partially or fully).

In practice, compilation of a source artifact can be considered unnecessary if it does not result in any observable change of a runtime artifact (e.g., disregarding artificial side effects like compilation timestamps and the like). For example, unnecessary compilation can be detected by comparing resulting runtime artifacts before and after compilation. A compiler can also implement a more sophisticated mechanism to detect that compilation is unnecessary without actually completing the entire compilation process.

An unchanged source artifact is neither a sufficient nor a necessary condition for compilation to be unnecessary. For example, if there are two source artifacts A and B, where A contains the definition of two independent types a1 and a2, and B contains a function b that makes use of type a1 but not a2, B is dependent on A. The following four scenarios of change possibilities illustrate when compilation is unnecessary:

1. Only the definition of function b changed: Compiling (changed) B is necessary.
2. Only some comments in B changed: Compiling (changed) B is unnecessary.
3. Only type a1 changed: Compiling (unchanged) B is necessary.
4. Only type a2 changed: Compiling (unchanged) B is unnecessary.

Example 9

Example Implementations of Detecting Unnecessary-to-Compile Source Artifacts In any of the examples herein, a variety of techniques can be used to detect when a source artifact is unnecessary to compile. Sometimes the phrase "was unnecessary" is used because the determination is made after compilation is completed. However, some techniques can make a determination without fully compiling the source artifact.

In practice, a source artifact is passed to a generate method of a compiler. Even if the source artifact has not changed, the compiler can check its validity. For example, if a database view selects from a table, if the table has changed, the view may become invalid (and need to be compiled) even if the views query has not changed at all. The view will be passed to its compiler for regeneration and the compiler at least checks to see whether it is still valid.

Given that a source artifact is passed to its compiler, different ways of how the compiler might find out that the source artifact does not have to be compiled (compilation is unnecessary) can be implemented. Such a determination can depend on the type of artifacts the compiler is responsible for, the capabilities of the compiler itself, and the features provided by other components of the system, such as the database catalog.

The following examples assume that the compiler was able to verify the validity of the source artifact.

The compiler might compare the source artifact to its corresponding runtime artifact and see that the runtime artifact is already described by the design time artifact. For instance, if the source artifact is the description of a database table, the compiler can request a description of the database table (e.g., the corresponding runtime artifact) from the database catalog in order to compute an SQL statement (e.g., CREATE TABLE or ALTER TABLE) that is executed to create or modify the table in a way that corresponds to the design time description. When computing the statement, the compiler can find that the table in the database catalog already fulfills the description. In such a case, partial compilation has taken place. The SQL statement is computed, but it is found to be "empty" and is not executed.

Other compilers can generate byte code from source code. Such a compiler can recognize that nothing has changed after it has generated the new byte code and compared it to the existing old byte code (e.g., compilation was unnecessary). In such a case, complete compilation has taken place.

Still other compilers can implement their own dependency management techniques. Such dependency management can be more sophisticated with respect to the object types the compiler is responsible for as compared to other dependency management techniques, but may be limited to such object types. Such a compiler can find out that a source artifact that initially appeared to be necessary to compile because it depends on another changed artifact actually is unnecessary to compile because the change applied to the other artifact has no impact on the object in question.

Another concrete example involves changes to a database table description. The corresponding database table exists in the database catalog, and a column is added. In the example, there exists a database view that selects from the table and there are many stored procedures that execute SELECT statements from the view.

The procedures are again called by other procedures, so there results a large subgraph of the dependency graph that is connected to the start set (e.g., which includes the database table) via the database view. In the activation of the table, two compilers can be involved: The compiler that is responsible for tables and views (e.g., a core data services (CDS) compiler) and the procedure compiler. When the table and view are passed to the CDS compiler for generation (e.g., in one call to the generate method), internally, it first generates the table: ALTER TABLE ADD COLUMN. Then it regenerates the view. The compiler can easily find out if the views query (e.g., in the source code) has not changed. So, the compiler can check whether the view is still valid. The can be done by directly asking the database catalog, "Is this view still valid?" if the catalog says "Yes," now the CDS compiler knows that the views source (e.g., query) case not changed and that it is still valid. Therefore, the CDS compiler can tell the framework "It was not necessary to generate the view." Now the framework can first prune the view and then whatever procedures that are connected to the start set only via the view. Such an approach can be typical in a database development scenario.

Example 10

Example Pruning

In any of the examples herein, pruning can be performed on a dependency graph representation of source artifacts. For example, responsive to determining that a source artifact is not necessary to compile, a source artifact node for the source artifact can be removed from the dependency graph representation. Associated edges (e.g., from the node) can also be removed. Such pruning modifies the dependency graph to indicate that a dependency does not actually exist.

Intermediate pruning can also take place that identifies additional nodes in the graph that can be pruned due to the fact of already having pruned other nodes. For example, a dependency removal can cascade to other nodes downstream. As described herein, certain nodes (e.g., in the start set) can be designated as immune to pruning (e.g., because they are known to have substantive changes or the like).

As a result of pruning one or more nodes, an entire strongly connected component of one or more nodes can be isolated. In any of the examples herein, isolation can be indicated when there are no incoming edges (e.g., no dependencies) in the graph representation to a strongly connected component. Another way of detecting isolation is that a path from a node in the start set to the strongly connected component cannot be found (e.g., because such a path is absent in the representation) (e.g., the strongly connected component is isolated from the start set by pruning). Such isolated strongly connected components can be pruned. Such pruning removes the nodes in the strongly connected component.

Strongly connected components can be accumulated and eliminated from the graph for topological sorting purposes, but such elimination need not impact the pruning decision. For example, if elimination of a strongly connected component during topological sorting leaves a strongly connected component with no incoming edges (e.g., it is a root node), such a condition does not necessarily mean that the strongly connected component can be pruned. Instead, while topological ordering can be controlled by the "incoming" attribute of the strongly connected component, an "incomingFromExternal" attribute for individual nodes and "incomingFromExternalAggregated" attribute can be tracked for strongly connected components to control pruning. If a strongly connected component has no nodes with remaining edges incoming from external strongly connected components, it can be identified as such and pruned.

As a result of any of the pruning techniques, further processing of the dependency graph (e.g., to determine what to compile next) can benefit from such pruning (e.g., by not compiling a source artifact in a pruned strongly connected component).

Example 11

Example Computing System Implementing Pruning

Figure 3:
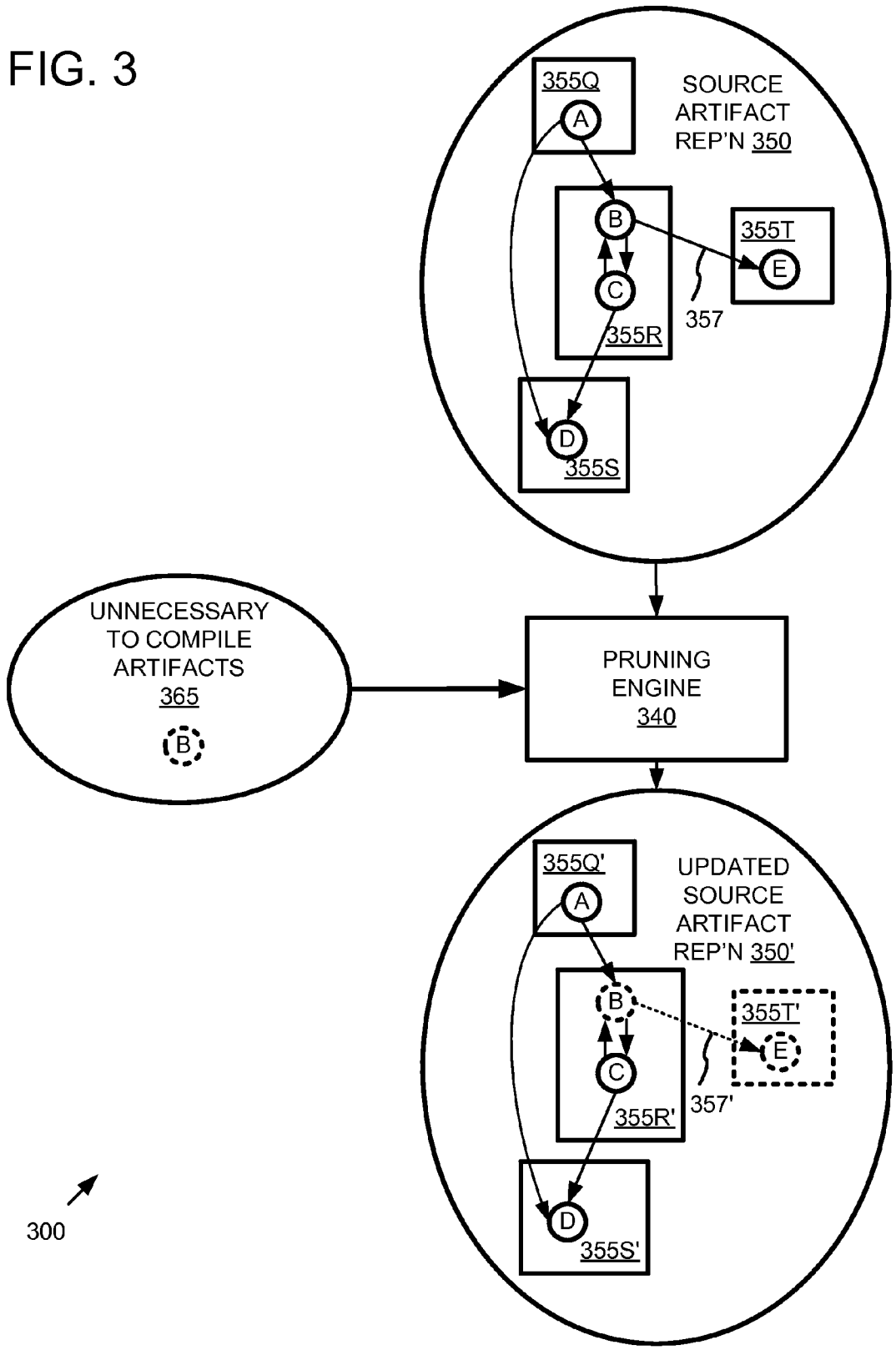
FIG. 3 is a block diagram of an example system implementing pruning for a dependency graph representation of dependencies for source artifacts.

FIG. 3 is a block diagram of an example computing system 300 implementing pruning for a dependency graph representation of dependencies for source artifacts and can be implemented in any of the examples herein, including the system of FIG. 1. In the example, a pruning engine 340 receives a source artifact representation 350 and unnecessary-to-compile source artifacts 365 as input and generates an updated (e.g., pruned) source artifact representation 350' as output. In practice, the representation 350 can be pruned in place rather than generating a new representation.

In the example, the source artifact representation 350 comprises a dependency graph representation of dependencies among source artifacts 350A-D as strongly connected components 355Q-T, including a dependency 357. The graph representation 350 is divided into strongly connected components associated with respective compilers.

The pruning engine 340 is configured to receive an indication that one or more source artifacts represented in the graph representation are unnecessary to compile and prune (e.g., remove nodes and thus dependencies for) nodes of the graph representation 350 by removing one or more nodes associated with unnecessary-to-compile artifacts 365 (e.g., as received from a compiler to which the artifact has been submitted for compilation) from the representation 350. As described herein, further (e.g., intermediate) pruning can result from removal of the unnecessary-to-compile artifacts 365.

In the example, removal of the source artifact node 350B results in isolation of a strongly connected component 355T. The pruning engine 340 can prune strongly connected components so isolated. Accordingly, the strongly connected component 355T can be pruned from the graph. As a result, compilation of the source artifacts 350E associated with the isolated strongly connected component can be avoided. In other words, the dependency 357 is removed from the graph representation 350. A determination of the next group of source artifacts to be compiled can omit 350E (e.g., or the compilation process can stop if no further artifacts are involved).

As described herein, an activation framework can direct the pruning engine 340 and be configured to examine the graph representation and determine a next group of one or more strongly connected components to submit to a given compiler. The activation framework can avoid compilation of source artifacts associated with strongly connected components pruned by the pruning engine 340.

As described herein, one or more source artifacts nodes of the graph representation can be designated as members of a start set, and the pruning engine can be configured to avoid pruning for nodes so designated.

Example 12

Example Method Implementing Pruning for a Dependency Graph

Figure 4:
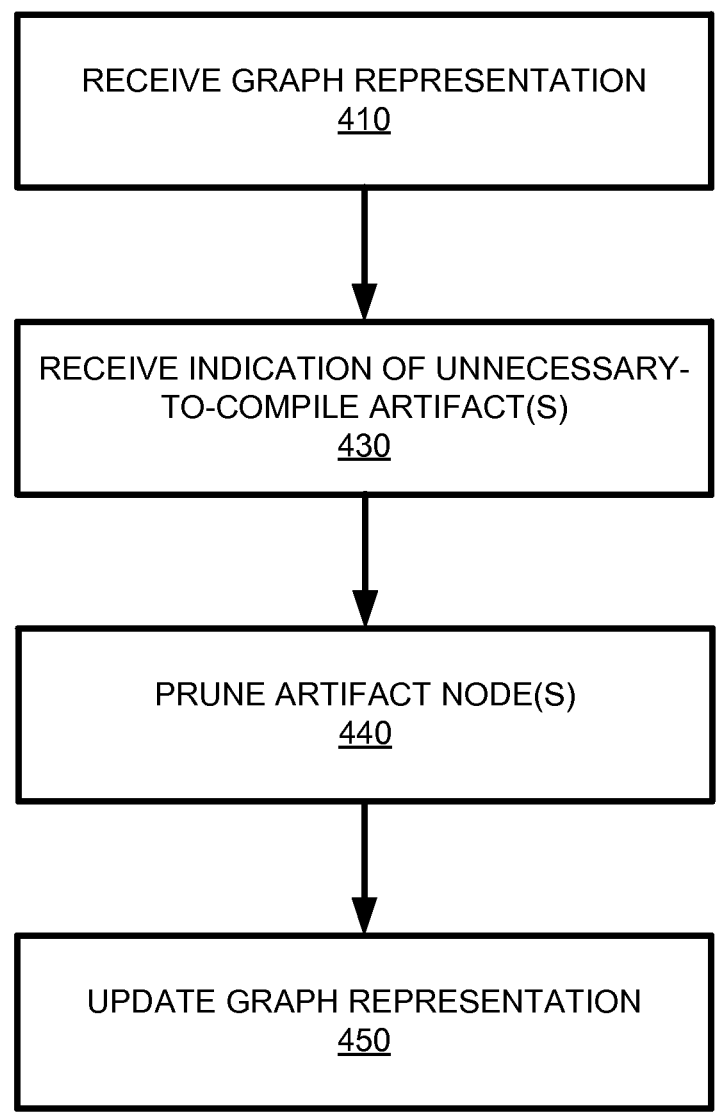
FIG. 4 is a flowchart of an example method implementing pruning for a dependency graph representation of dependencies for source artifacts.

FIG. 4 is a flowchart of an example method 400 implementing pruning for a dependency graph representation of dependencies for source artifacts and can be implemented, for example, in the system 300 of FIG. 3 or the system 100 of FIG. 1 and can accomplish the pruning described for FIG. 2.

As described herein, a subset of the source artifacts can be identified as a start set (e.g., that have changes that are believed to require recompilation), and source artifacts associated with the start set can be compiled regardless of circumstances, even if the associated source artifact nodes end up being pruned (e.g., which can lead to further useful pruning). In practice, such an approach can be used to implement a behavior that can be simplified as "compile the start set and any source artifacts that may be affected by compilation of the start set."

At 410, a dependency graph representation of dependencies for source artifacts can be received. As described herein, the source artifacts can be represented in the dependency graph representation as source artifact nodes. The source artifact nodes can be grouped into strongly connected components associated with respective compilers appropriate for compiling the represented source artifacts therein. Such grouping can be performed by an activation framework as described herein.

As described herein, one or more groups of strongly connected components can then be submitted for compilation by the associated compiler. The groups can be chosen via the topological sorting (e.g., by continuing to accumulate strongly connected components until a strongly connected component for a different compiler is encountered) and incoming edge tracking techniques described herein. Such a technique is sometimes called identifying a "next" set of source artifacts to compile and can be accomplished via a topological sort of the strongly connected components. Such a sort can be achieved as a byproduct of grouping into strongly connected components. Further modifications can be made so that strongly connected components of the same compiler are grouped together in the topological order.

At 430, an indication that one or more of the source artifacts represented in the dependency graph representation are unnecessary to compile can be received. As described herein, such an indication can be received as a result of submitting source artifacts (e.g., including the unnecessary-to-compile artifacts) to a compiler. The compiler can provide the indication.

At 440, responsive to receiving the indication, one or more source artifact nodes in the dependency graph representation for the one or more source artifacts indicated as unnecessary to compile can be pruned from the dependency graph representation. Based on having pruned the unnecessary-to-compile nodes, further nodes can be pruned from the graph representation (e.g., based on whether dependencies have been removed via pruning) via intermediate pruning.

At this initial pruning stage, pruning can be done at the node level. For example, although the source artifact nodes are grouped into strongly connected components, pruning can remove a proper subset of the source artifact nodes in a strongly connected component comprising a plurality of source artifact nodes.

At 450, the dependency graph representation is updated after the pruning of 440. As described herein, such updating can include identifying isolated strongly connected components (e.g., isolated via pruning the source artifact nodes, including intermediate pruning) and further pruning the graph representation by removing the identified isolated strongly connected components.

Isolation can be achieved directly or indirectly (e.g., via intermediate pruning as described herein) and isolated strongly connected components can be accomplished by identifying a strongly connected component with no incoming edges (e.g., from any other strongly connected component or nodes external to the component). A distinction can be made, and different attributes tracked for an incoming edge count used for the topological ordering (e.g., SCC.incoming) and the incoming edge count(s) used for pruning (e.g., node.incomingFromExternal and SCC.incomingFromExternalAggregated, which is the sum of (node.incomingFromExternal) for nodes in the strongly connected component).

As described herein, the compilation process can continue. For example, the next set of strongly connected components to compile can be identified as described herein. Other source artifacts can be compiled (e.g., with one or more other compilers than those used to compile the source artifacts in the current iteration) based on the pruned representation of the dependency graph representation. Thus, a first subset of the source artifacts associated with a first subset of the strongly connected components can be submitted to a first compiler, and a second subset of the source artifacts associated with a second subset of the strongly connected components can be submitted to a second compiler.

The graph can be updated to reflect that some source artifacts have been compiled. An incoming edge count (e.g., from ungenerated strongly connected components) can be maintained for respective of the strongly connected components.

If dependencies have been removed via pruning, compilation for source artifacts associated with the pruned nodes can be avoided even though the source artifacts were originally indicated as to be compiled due to a dependency in the representation that is subsequently pruned.

So, as a result of pruning the one or more strongly connected components from the dependency graph representation isolated via pruning, compilation can be omitted for the source artifacts represented by the pruned strongly connected components.

Example 13

Example Intermediate Pruning

In any of the examples herein, after a node is pruned from the dependency graph, downstream nodes can also be removed via intermediate pruning. In some cases, such intermediate pruning does not achieve avoidance of compilation, but in other cases, pruning can extend to (e.g., isolate) a strongly connected component that has yet to be submitted for compilation.

Example 14

Example "Next" Group to Compile

In any of the examples herein, various techniques can be used to determine which source artifacts represented in the dependency graph should be next compiled. As described herein, after the dependency graph is topologically sorted, compilation can proceed by traversing strongly connected components of the graph (e.g., starting at root components) and updating the graph to note which source artifacts have been compiled (also sometimes called "generated"). For example, a strongly connected component with no un-generated incoming edges can be considered a root and be compiled "next."

Example 15

Example Detailed Technique for Building and Pruning Dependency Graph

For a directed graph G=<V, E>, a set of vertices called the "start set" can be given such that each element v of V is reachable from the start set. An exemplary implementation, including topological sorting can be accomplished by using strongly connected components (SCCs) as follows. Tarjan's algorithm can be used to determine the SCCs, and also finds SCCs in a reverse topological order. Hence, once an SCC is complete, its children are known to be complete as well.

Let G=<V, E> be the dependency graph representation. To each vertex v in V (e.g., the dependency graph representation), an attribute v.incomingFromExternal can be added that will contain the number of incoming edges of the vertex such that the source of the edge does not belong to the SCC of v. For each v in V, v.incomingFromExternal is first be initialized to 0. Once an SCC scc has been discovered by Tarjan's algorithm for each v in scc and for each w such that there exists an edge <v, w> in E and w is not a member of scc, we set w.incomingFromExternal:=w.incomingFromExternal+1.
Eventually when the SCC algorithm terminates the attribute will be up to date for each v in V.

To prune a set of vertices P from V, let SCCP be the set of their SCCs. It can be assumed that all elements of P have already been passed to the generate method of their corresponding compiler. Considering one SCC scc from SCCP and letting P0 be the intersection of P and scc, the set of vertices v from scc–P0 can be used such that v.incomingFromExternal>0 or v is in the start set as the basis for a search inside scc–P0. Hence a depth first search or a breadth first search can be run such that in the main loop only elements from scc–P0 that have v.incomingFromExternal>0 or are members of the start set are considered, and only edges such that their target is a member of scc–P0 are considered. The set of vertices found can be designated as DoNotPrune. DoNotPrune contains all vertices from scc–P0 that are directly or indirectly reachable from another SCC and all members of the intersection of the start set and scc that are not in P0. Its complement in scc, scc–DoNotPrune, is the full set of vertices that may be pruned from scc, which is called "P1" herein.

DoNotPrune can thus be completed by a search to also find vertices that can be reached from another SCC indirectly via vertices from scc. The search and calculating the complement does not need to be performed if the compilers are trusted to mark all vertices that did not require generation. Then, the example can simply use SCCP as the full set of vertices to be pruned from scc.

For each v in P1 and each w in V such that there is an edge <v, w> in E and w is not a member of scc, the technique can set w.incomingFromExternal:=w.incomingFromExternal−1. The SCC of w can be designated as sccw. If max(x.incomingFromExternal) for x in sccw goes down to 0 and if sccw does not contain a vertex from the start set the technique may prune sccw as well. Note that else if sccw and P are disjoint there is still a path from the start set to each member of sccw and the technique must not prune any vertex from sccw. When coding such an approach, max(x.incomingFromExternal) for x in sccw goes down to 0 can be equivalent to sccw.incomingFromExternalAggregated going down to 0.

If the technique prunes a complete SCC that has not yet been added to the result list (incoming >=0) the technique has to update the incoming count of its children by subtracting 1. The incoming attribute can be used to control the topological ordering. scc.incoming=0 means that scc is a root and can be passed to the generate method of its compiler without violating any dependencies.

If P happens to intersect with more than one SCC, the technique applies the procedure to these SCCs in the reverse order in which the SCCs have been found. Note that this is a topological order. Hence if there is a path from say scc1 to scc2, scc1 is processed before scc2. More precisely the technique starts with the last SCC found that has a nonempty intersection with P (e.g., called "scc") and determines its full set of vertices that may be pruned. The technique updates the incomingFromExternal count of its children. If a child SCC does not have any element from the start set and max(x.incomingFromExternal) for x in the child SCC is 0, the technique prunes it and updates the children recursively. When no more SCCs that can be pruned are found, the technique considers the previous SCC found before the scc (which is the next in the topological order) that intersects P. The technique determines its full set of vertices that may be pruned and updates the incomingFromExternal count of its children.

The technique can apply this procedure iteratively until all SCCs intersecting P have been processed and the technique does not find any vertices that can be pruned anymore. The technique need process every scc at most once because the technique processes them in the topological order produced by Tarjan's algorithm and processing an SCC influences other SCCs only if they are direct or indirect children.

Example 16

Example Pruning Goal Overview

For a directed graph G=<V, E>, a set of vertices called the "start set" can be given such that each element v of V is reachable from the start set. The technique can first determine the strongly connected components of G using Tarjan's algorithm and then sort the result topologically by successively processing (and eliminating for purposes of topological ordering) root vertices. Whenever the technique adds some strongly connected components to the list of topologically sorted (e.g., processed) strongly connected components, the technique may receive additional information form external sources (e.g., that some elements of the components just added can be pruned from G). If some vertices are pruned from G, further vertices may lose their connection to the start set. These can be pruned as well. If P is the initial set of pruned vertices, the goal is to prune all vertices that P separates from the start set.

Example 17

Example Dependency Graph Building

Figure 5:
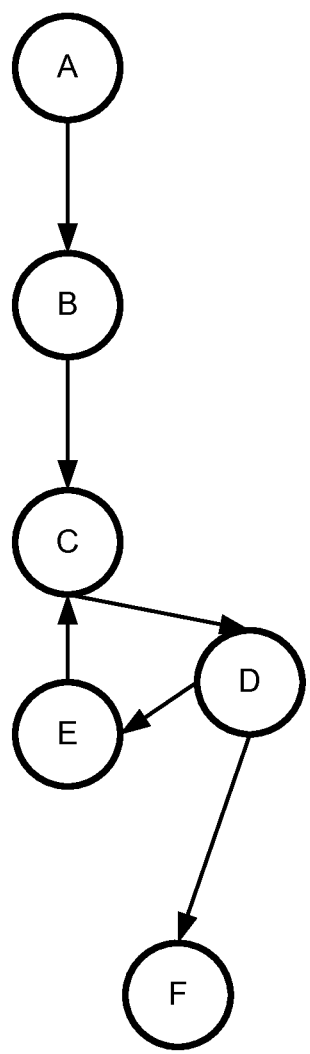
FIG. 5 is a block diagram of an example dependency graph representation of dependencies for source artifacts.

In any of the examples herein, a dependency graph can take any of a variety of forms, such as the example graph 500 in FIG. 5 that is a dependency graph representation of dependencies for source artifacts. In the example, a source artifact node 500A-F can represent a particular source artifact, and a directed edge between nodes 500A-F can represent a dependency between the represented nodes 500A-F. Any number of techniques can be used to discover and manage the indicated dependencies in light of changes to the represented design time objects (e.g., source artifacts). For example, when a source artifact is stored in a repository, an activation plugin can be called to determine the objects that the stored artifact depends on.

For example, if a procedure is saved, the procedure compiler is called, if it finds a query like
SELECT*FROM "MyTable"
in the procedure, it knows that the procedure depends on MyTable and returns a cross reference from the procedure to MyTable. The cross reference can be stored in a database. During activation, the activation framework can read the cross references from the database.

Alternatively, dependency information can be provided by users (e.g., source authors), such as in the form of makefiles or the like. As described, in some environments, it is possible to determine dependencies by scanning source artifacts for strings that are known to match a pattern indicating a reference to another runtime artifact. Other techniques can employ the compiler using a dedicated "discover dependencies only" mode of (pre-)compilation that can be applied to single sources.

Dependencies can be specified as to be over-inclusive (e.g., claiming unnecessary dependencies is acceptable while omitting an actual dependency is considered to be an error).

In the example, A-E are compilable by a first compiler $R_1$, and F is compilable by a second compiler $R_2$.

A step by step walkthrough of building the dependency graph representation with strongly connected components follows. The example calls the incoming count used for the successive elimination of roots for topological ordering purposes "incoming." Note that it has to be distinguished from the incoming count used for pruning of other vertices carefully as described herein. The topological ordering technique can track the strongly connected components that are roots for purposes of the topological ordering (e.g., have no incoming edges for purposes of the topological ordering). For example, if scc.incoming=0, then it is a root can be added to the result list that is submitted to the compiler. Such a root can be eliminated from the graph for purposes of the topological ordering, and the incoming count for children of the root can be decremented by 1. For each SCC scc:scc.incoming=the number of incoming edges of scc in the SCC graph. The graph can be different from the graph of source artifacts. The SCC graph can be created by partitioning the source artifact graph as described herein.

For pruning of additional vertices designated by a compiler, the technique can use the incomingFromExternal attribute. It is not an attribute of an SCC, but rather an attribute of a vertex in the original dependency graph of source artifacts. For a source artifact v:v.incomingFromExternal-number of edges <u, v> such that u is not a member of SCCV, SCCV is the SCC v belongs to. On the granularity of SCCs, the techniques can maintain another attribute, scc.incomingFromExternalAggregated as a performance optimization. scc.incomingFromExternalAggregated can be the sum of all v.incomingFromExternal for v in scc. If scc.incomingFromExternalAggregated is 0, it is known that scc has no incoming connection to the start set. If in addition, scc does not contain a start set member, scc may be pruned.

Initially incomingFromExternal is 0 for each vertex. Now the example starts by applying an extension of Tarjan's algorithm (e.g., setting incomingFromExternal as described herein).

Initially, the stack is empty, v.index is undefined for each v and the global index is A. Assume the main loop starts with B. A modified implementation of Tarjan's algorithm using "index" and "lowlink" can be applied as follows.

Then B.index:=0, B.lowlink:=0, index:=1, B is pushed on the stack.

The example moves on to C. C.index:=1, C.lowlink:=1, index:=2, C is pushed.

The example moves to D. D.index:=2, D.lowlink:=2, index:=3, D is pushed and

The example moves to E. E.index:=3, E.lowlink:=3, index:=4, E is pushed.

The example investigates the second edge of D which leads to F:F.index:=4, F.lowlink:=4, index:=5, push F. F has no edges and F.lowlink==F.index. Hence the example finds the first SCC by removing elements from the stack until it finds F (which is the top element). The first SCC consists of F only. As it has no children, the incomingFromExternal and the incoming counts do not have to be updated for any children.

The example returns from recursion to D and E and from there it moves to C. C.index is defined (==1) and C is on the stack. Hence E.lowlink:=min(E.lowlink, C.index)==1.

The example has E.lowlink!=E.index hence it returns from the recursion: D.lowlink:=E.lowlink==1.

As D.index is 2, it returns from the recursion again. C.lowlink:=D.lowlink==1. Now C.index==1. Hence C is the root of an SCC and the example builds the second SCC by removing vertices from the stack until it finds C. This SCC consists of C, D and E. The example now looks at the children of C, D and E that do not belong to the SCC. Only F fulfills this condition. We set scc(F).incoming:=1, F.incomingFromExternal:=1. The stack now contains only B.

Again the example returns from a level of recursion to vertex B. It finds the third SCC that consists of B only and set scc(C).incoming:=1 and C.incomingFromExternal:=1.

Now we are back in the main loop of Tarjan's algorithm and consider A. A.index:=5, index:=6, A.lowlink:=5 and we push A on the stack (which was empty before). Looking at the edges of A we only find the connection to B. B is not on the stack. Hence we discover our last SCC which consists of A only. The example sets scc(B).incoming:=1, B.incomingFromExternal:=1.

Tarjan's algorithm terminates as the main loop does not find further vertices that have not yet been processed.

Figure 6:
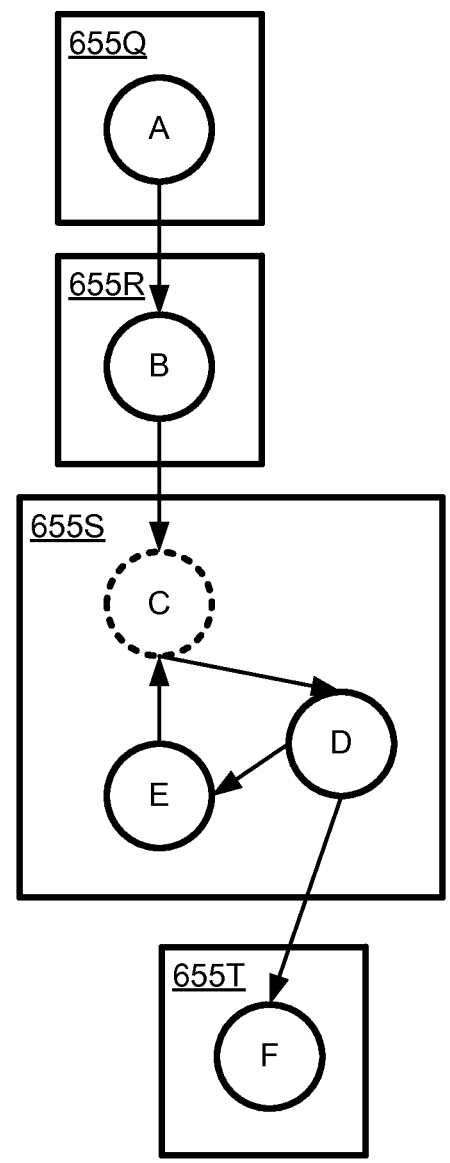
FIG. 6 is a block diagram of an example dependency graph representation of dependencies for source artifacts organized into strongly connected components.

FIG. 6 shows the resulting dependency graph 600 organized into strongly connected components 655Q-T.

Now the example has the following situation: Start set: {A}.

SCCs in the reverse order in which they were discovered is as follows:

scc1 (655Q)={A}, scc1.incoming=0, A.incomingFromExternal=0 scc2 (655R)={B}, scc2.incoming=1, B.incomingFromExternal=1 scc3 (655S)={C, D, E} scc3.incoming=1, C.incomingFromExternal=1, D.incomingFromExternal=0, E.incomingFromExternal=0 scc4 (655T)={F}, scc4.incoming=1, F.incomingFromExternal=1.

The dependency graph can now be traversed to accomplish activation of A.

The example starts the topological ordering by identifying and accumulating root nodes: The only root is scc1 (655Q). It will be the first element of the topologically sorted list. The example sets scc2.incoming:=0. Hence next the example adds scc2 (655R) to the result and sets scc3.incoming:=0. Therefore the example add scc3 (655S) to the result list.

Now, the compiler R1 is called for scc1, scc2, and scc3, and information that C can be pruned is received from the compiler on return. This means the example gets the information that actually it was not necessary to generate (compile) C. P0={C}. The example runs a search in scc3 (655S) that considers only vertices v such that v is not pruned and v.incomingFromExternal >0 or v is in the start set. There is no such vertex. Hence the set P1 of vertices that can actually be pruned from scc3 (655S) is {C, D, E}.

Now the example considers the children of P1 that are not in scc3 (655S). The example finds only F and sets F.incomingFromExternal:=F.incomingFromExternal−1=0. Now max(x.incomingFromExternal) for x in scc4 (655T) is 0, and scc4 (655T) does not contain an element from the start set. Hence the example can prune scc4 (655T). Since scc4 (655T) has no children, and scc3 (655S) has already been generated, the example is done.

Example 18

Example Pruning Engine: Tracking Data Structures

Figure 7:
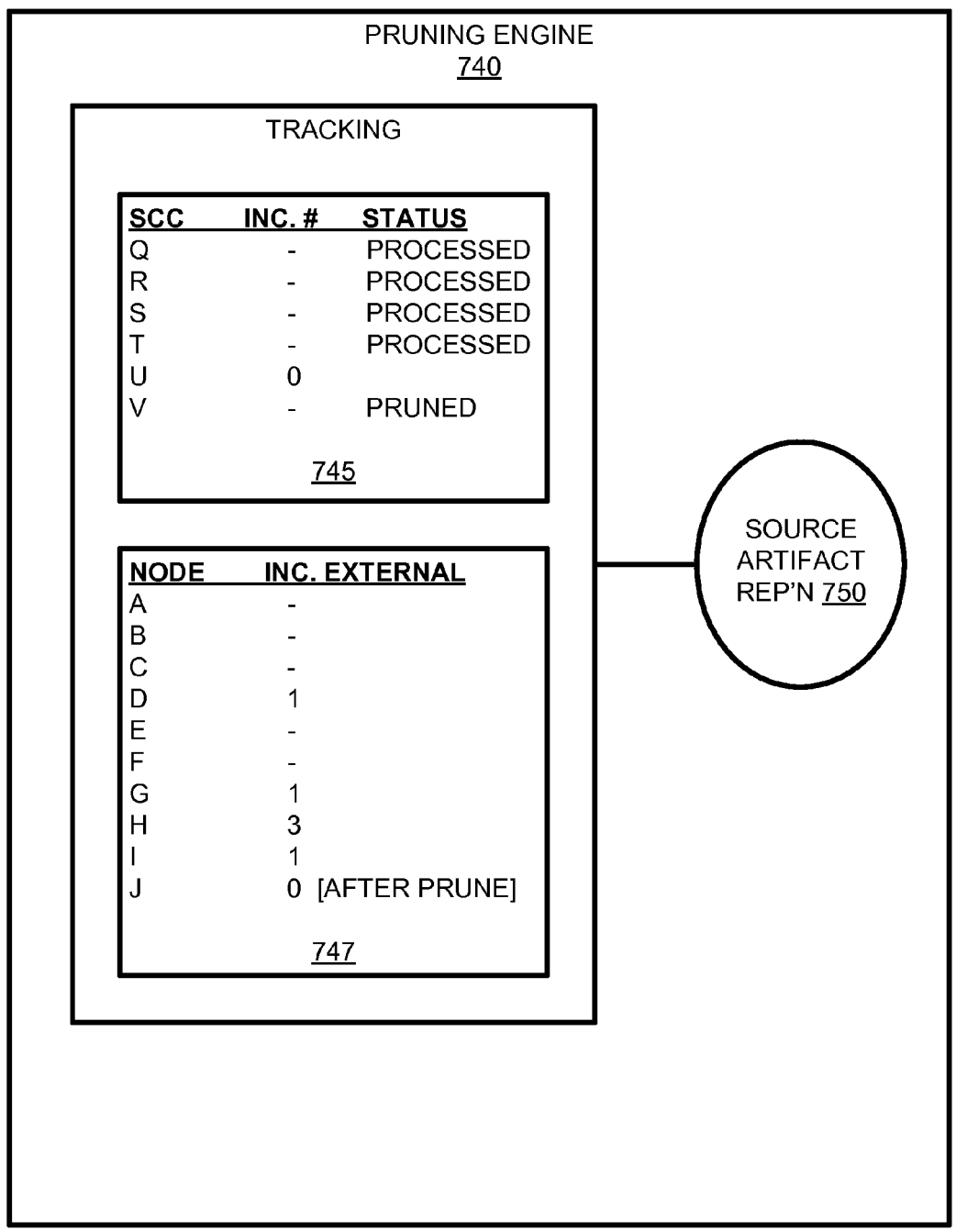
FIG. 7 is a block diagram of an example pruning engine comprising tracking data structures.

FIG. 7 is a block diagram of an example pruning engine 740 comprising a tracking data structures 745 and 747 that represent useful information about the dependency graph representation 750 and can be used in any of the examples herein. Any of a variety of arrangements can be used to track information about strongly connected components, nodes, or both. In the example, a strongly connected component tracking data structure 745 tracks the number of incoming edges for a particular strongly connected component in the graph representation 750 for purposes of topological ordering (e.g., choosing the next component to compile) and the status of the strongly connected component. Such information can be stored in a separate data structure, incorporated into the graph representation, or both.

The number of incoming edges can be used to determine the current root of a tree view of the dependency graph 750 (e.g., if incoming is "0," the strongly connected component is a root and is not waiting on dependencies), which can be useful when determining the next strongly connected component to compile. The number of incoming edges can be updated as the graph 750 is processed (e.g., accumulated roots are eliminated for purposes of the topological ordering and submitted for compilation). Multiple incoming edges from a same strongly connected component can be counted as a single edge.

The status of the strongly connected component can be used to track whether a component has been processed (e.g., compiled), pruned, or the like. In practice, the status can be indicated as special values for the number of incoming nodes (e.g., a first special value (e.g., −1) indicates processed, a second special value (e.g., −2) indicates pruned, or the like).

Another tracking data structure 747 can be at the node granularity level and keep track of the number of incoming edges from external strongly connected components (e.g., called "incomingFromExternal" herein). The number of incoming from external edges can be tracked to determine when a node can be pruned as described herein.

A performance enhancement can be achieved by storing an aggregation of counts for the nodes in a strongly connected component as described herein. Such aggregated counts can be stored as associated with respective strongly connected components.

The particular example shown represents example data structure contents after pruning node G and strongly connected component V in the example described below.

Example 19

Another Example Dependency Graph

Figure 8:
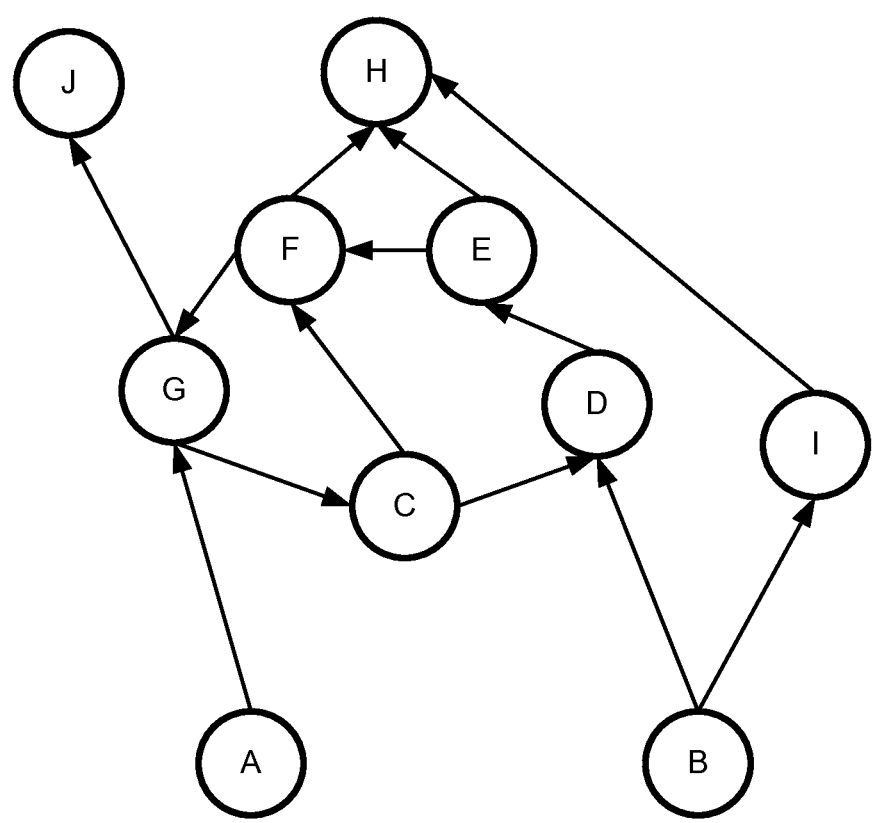
FIG. 8 is a block diagram of another example dependency graph representation of dependencies for source artifacts.

In any of the examples herein, a dependency graph can take any of a variety of forms, such as the example graph 800 in FIG. 8 that is a dependency graph representation of dependencies for source artifacts. In the example, a source artifact node 800A-J can represent a particular source artifact, and a directed edge between nodes 800A-J can represent a dependency between the represented nodes 800A-J.

Figure 9:
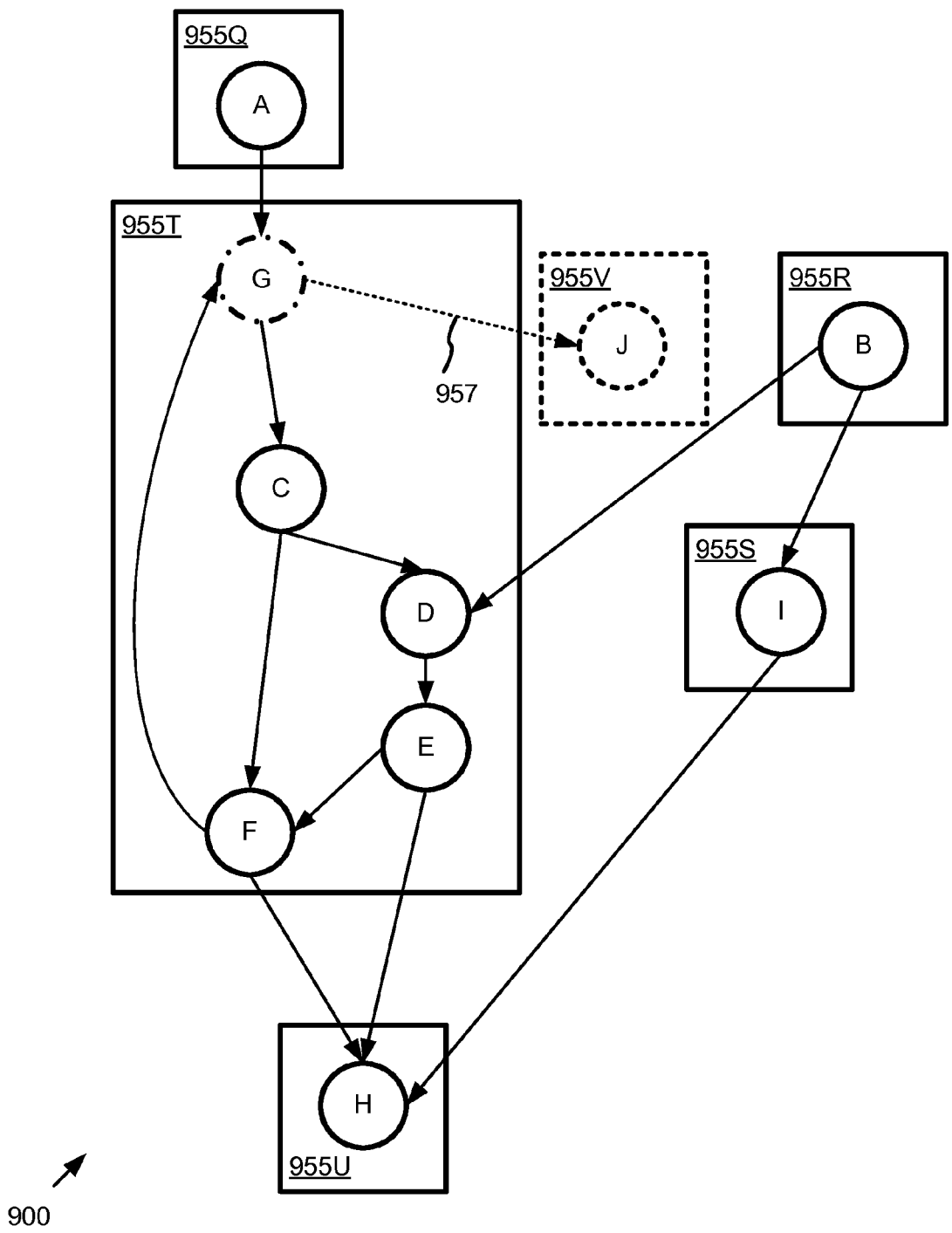
FIG. 9 is a block diagram of another example dependency graph representation of dependencies for source artifacts organized into strongly connected components.

FIG. 9 shows a representation 900 in which the nodes 800A-J are organized (e.g., grouped) into strongly connected components 955Q-V. As described herein, a variety of techniques, such as topological sorting and a variant of Tarjan's algorithm can be used to achieve such organization. The nodes can be organized so that the nodes 900C-G for a particular connected component 955T represent source artifacts compilable by a single compiler (e.g., the nodes for a given connected component are limited to those representing source artifacts compilable by a single compiler).

Associations between the compilers and the source artifacts can be tracked explicitly for the nodes, the connected components, or both.

Example 20

Example Execution of Pruning Technologies

FIG. 8 is a block diagram 800 of an example dependency graph representation of dependencies for source artifacts that is used to illustrate an exemplary execution of the technologies described herein. In the example, a number of source artifacts are represented by respective source artifact nodes 800A-J with edges indicating dependencies among the artifacts as described herein. In the example, nodes 800A, B, C, D, E, F, G, and I are associated with a first compiler $R_1$, and nodes 800 H and J are associated with a second compiler $R_2$. The start set is 800A and D.

The nodes can be grouped into strongly connected components 955Q-V as shown in FIG. 9. As described herein, information for the strongly connected components and the nodes can be maintained in data structures for use during the iterative compilation process.

Initially, the following information can be stored for the strongly connected components:

| SCC | Incoming edges | Finishing Time |
|---|---|---|
| Q | 0 | 3 |
| R | 0 | 5 |
| S | 1 | 4 |
| T | 2 | 2 |
| U | 2 | 0 |
| V | 1 | 1 |

The following information can be stored for the nodes:

| Node | External Incoming | Pruned? | SCC |
|---|---|---|---|
| A | 0 | 0 | Q |
| B | 0 | 0 | R |
| C | 0 | 0 | T |
| D | 1 | 0 | T |
| E | 0 | 0 | T |
| F | 0 | 0 | T |
| G | 1 | 0 | T |
| H | 3 | 0 | U |
| I | 1 | 0 | S |
| J | 1 | 0 | V |

At this point, the strongly connected component with the highest finishing time and no dependencies (SCC 955R) is chosen to be compiled. In practice, the strongly connected components can be added to an ongoing list for a given compiler until a strongly connected component for a different compiler is encountered. It can then be indicated as processed in the representation 900. Accordingly, the data structures can be updated as follows:

| SCC | Incoming edges | FinishingTime |
|---|---|---|
| Q | 0 | 3 |
| R | [processed] | 5 |
| S | 0 | 4 |
| T | 1 | 2 |
| U | 2 | 0 |
| V | 1 | 1 |

The information stored for the nodes can remain unchanged.

At this point, a remaining unprocessed strongly connected component with no dependencies (SCC 955S) is chosen to be compiled. It is not necessary to consider finishing time here. The finishing time can be considered when applying the pruning procedure to SCCs that intersect DidNotNeedToBeGenerated. It can then be indicated as processed in the representation 900. Accordingly, the data structures can be updated as follows:

| SCC | Incoming edges | Finishing Time |
|---|---|---|
| Q | 0 | 3 |
| R | [processed] | 5 |
| S | [processed] | 4 |
| T | 1 | 2 |
| U | 1 | 0 |
| V | 1 | 1 |

The information stored for the nodes can remain unchanged.

At this point, the remaining unprocessed strongly connected component with the highest finishing time (SCC 955Q) and no dependencies is chosen to be compiled. It can then be indicated as processed in the representation 900. Accordingly, the data structures can be updated as follows:

| SCC | Incoming edges | Finishing Time |
|---|---|---|
| Q | [processed] | 3 |
| R | [processed] | 5 |
| S | [processed] | 4 |
| T | 0 | 2 |
| U | 1 | 0 |
| V | 1 | 1 |

The information stored for the nodes can remain unchanged.

At this point, the remaining unprocessed strongly connected component with the highest finishing time (SCC 955T) and no dependencies is chosen to be compiled. It can then be indicated as processed in the representation 900. Accordingly, the data structures can be updated as follows:

| SCC | Incoming edges | Finishing Time |
|---|---|---|
| Q | [processed] | 3 |
| R | [processed] | 5 |
| S | [processed] | 4 |
| T | [processed] | 2 |
| U | 0 | 0 |
| V | 0 | 1 |

The information stored for the nodes can remain unchanged.

As a result of the compilation of the source artifacts associated with SCC 955T, an indication that the source artifact associated with the source artifact node 900G was unnecessary to be compiled can be received. As a result, 900G is pruned from the representation 900. The edge 957 can also be removed as part of the pruning. Intermediate pruning can remove further nodes (e.g., 900C) that were indicated as depending on the unnecessary-to-compile node. However, 900D was indicated as part of the start set, so 900D (and nodes that truly depend on it) cannot be pruned. J.incomingFromExternal can be decremented by 1 because the edge 957 has been removed via pruning.

As a result of removing the node 900G for the unnecessary-to-compile source artifact, the strongly connected component 955V is isolated in the dependency graph (e.g., there are no incoming edges). Accordingly, 955V can be identified as isolated and pruned from the representation 900 as a result of having been so identified. As a result, compilation of source artifacts associated with any nodes 900J that are members of the strongly connected component 900J can be avoided. Accordingly, the data structures can be updated as follows:

| SCC | Incoming edges | Finishing Time |
|---|---|---|
| Q | [processed] | 3 |
| R | [processed] | 5 |
| S | [processed] | 4 |
| T | [processed] | 2 |
| U | 0 | 0 |
| V | [pruned] | 1 |

The following information can be stored for the nodes:

| Node | External Incoming | Pruned? | SCC |
|---|---|---|---|
| A | 0 | 0 | Q |
| B | 0 | 0 | R |
| C | 0 | 1 | T |
| D | 1 | 0 | T |
| E | 0 | 0 | T |
| F | 0 | 0 | T |
| G | 1 | 1 | T |
| H | 3 | 0 | U |
| I | 1 | 0 | S |
| J | 0 | 1 | V |

Finally, the remaining unprocessed strongly connected component with the highest finishing time (SCC 955U) and no dependencies is chosen to be compiled. It can then be indicated as processed in the representation 900. Accordingly, the data structures can be updated as follows:

| SCC | Incoming edges | Finishing Time |
|---|---|---|
| Q | [processed] | 3 |
| R | [processed] | 5 |
| S | [processed] | 4 |
| T | [processed] | 2 |
| U | [processed] | 0 |
| V | [pruned] | 1 |

The information stored for the nodes can remain unchanged.

At this point, it is indicated that the process is finished because there are no unprocessed unpruned strongly connected components remaining. As described, compilation of the source artifacts for the pruned strongly connected component has been avoided.

Example 21

Example Implementation

The following pseudocode for a function TopologicalSortOfStronglyConnectedConnponentsWithPruning illustrates an example implementation of the technologies described herein. In the example, G=<V, E> is a graph of source artifacts as described herein.

A subset StartSet of V is given. StartSet is the set of vertices (source artifacts) that have to be generated in any case because they changed or the user explicitly requested to generate them. Hence members of StartSet must never be pruned before they have been generated.

In our concrete application, it may turn out that for technical reasons some other vertices must not be pruned as well. Therefore there can be a function mustNotBePruned(scc): bool on the set of SCCs such that mustNotBePruned(scc) returns true if and only if scc has a member that must not be pruned. Nodes in the start set can be pruned like others, as long as compilation is guaranteed. Alternatively, nodes in the start set can be immune from pruning completely.

A set of compilers (also called "activation plugins") is given such that for each v in V there is a compiler R that is responsible for v.

Each compiler has a method generate that generates a runtime representation from the source artifact:

method R.generate(Next):DidNotNeedToBeGenerated

The parameter Next is a set of SCCs. The result DidNotNeedToBeGenerated is a set of vertices from V. Each element of DidNotNeedToBeGenerated belongs to some element of Next. When the compiler puts a source artifact into DidNotNeedToBeGenerated, it tells us that nothing had to be done about this file and that it may be pruned.

There are some attributes that can be stored. Each v in V has an attribute incomingFrornExternal that is initialized to the number of incoming edges such that the source of the edge belongs to an SCC different from the SCC v belongs to.

Each strongly connected component has an attribute incomingFromExternalAggregated. For each SCC scc incomingFrornExternalAggregated is initialized to the cardinality of {e=<v, w> in E|w in scc and v not in scc}. This is the sum of all v.incomingFromExternal where v in scc. Note that incomingFromExternalAggregated is not required logically for the algorithm to function correctly. It could be computed when needed from the v.incomingFromExternal values (for v in scc). It is just a performance optimization to store this aggregate value.

Each strongly connected component has an attribute incoming, which is the number of incoming edges in the SCC graph.

There can be additional data structures. RootContainer is a container of SCCs that are roots. This means that an SCC scc is a member of RootContainer if and only if scc.incoming=0. RootContainer has methods push and pop. push inserts a new element. pop returns a member and removes it. If we call pop several times RootContainer makes sure that the returned sccs that belong to the same compiler are not interleaved by sccs belonging to other compilers if this is not necessary because of dependencies.

Pseudocode 1 - Main procedure of the technique

```
procedure topologicalSortOfStronglyConnectedComponentsWithPruning(G):
    SCC := <scc0, scc1, ..., sccn> := tarjansSCCAlgorithm(G)
    //SCC is the sequence of SCCs computed by Tarjan's SCC algorithm
    //tarjansSCCAlgorithm also initializes scc.incoming and scc.incomingFromExternalAggregated for each
    //scc in SCC and v.incomingFromExternal for each v in V.
    Let Gscc := <SCC, Escc> be the graph of SCCs that we get by indentifying the vertices in each SCC.
    for each scc in SCC such that scc.incoming = 0:
        RootContainer.push(scc)
    end for
    Next := { } //emtpy set of SCCs
    R := null //a compiler
    while RootContainer is not empty: //RootContainer will be empty if and only if Gscc is empty.
        scc := RootContainer.pop( )
        if R is null:
            R := the compiler responsible for scc
        end if
        if R is responsible for scc:
            insert scc into Next
            for each scc2 in SCC such that <scc,
```

Pseudocode 1 - Main procedure of the technique
-continued

```
            scc2> in Escc:
                scc2.incoming := scc2.incoming - 1
                if scc2.incoming = 0:
                    RootContainer.push(scc2)
                end if
            end for
            remove scc from Gscc
        else
            DidNotNeedToBeGenerated := R.generate(Next)
            R := the compiler responsible for scc
            RootContainer.push(scc) //return scc to the RootContainer. We will process it later.
            pruneVertices(DidNotNeedToBeGenerated, G, Gscc)
        end if
    end while
end procedure
```

Another part of the pseudocode can prune vertices that did not need to be generated from the graph. It can find all vertices and SCCs that lose their connection to the start set and therefore can be removed in addition. They can be pruned as well.

Pseudocode 2 - PruneVertices

```
procedure pruneVertices(DidNotNeedToBeGenerated, G, Gscc):
    Let Q := <> be an empty vector of SCCs
    for each v in DidNotNeedToBeGenerated:
        sccv := the SCC v belongs to
        put sccv into Q
    end for
    sort Q according to the topological order calculated by Tarjan's SCC algorithm
    remove duplicates from Q
    for each scc in Q:
        ToBePrunedFull := determineFullSetOfVerticesToBePrunedFrom(scc)
        //ToBePrunedFull is a subset of scc and potentially a superset of
        //the intersection of scc and DidNotNeedToBeGenerated
        if scc = ToBePrunedFull: //we may remove scc completely
            pruneSCC(scc)
        else:
            for each v in ToBePrunedFull:
                for each w in V – scc such that <v, w> in E:
                    w.incomingFromExternal := w.incomingFromExternal - 1
                    sccw := the SCC w belongs to
                    sccw.incomingFromExternalAggregated := sccw.incomingFromExternalAggregated - 1
                    if sccw.incomingFromExternalAggregated = 0 and not mustNotBePruned(sccw):
                        pruneSCC(sccw)
                    end if
                end for
            end for
        end if
    end for
end procedure
```

Another part of the pseudo code can remove a complete SCC.

```
Pseudocode 3 - pruneSCC procedure pruneSCC(scc):
    for each scc2 in SCC such that <scc, scc2> in
Escc:
        scc2.incoming := scc2.incoming – 1
        if scc2.incoming = 0:
            RootContainer.push(scc2)
        end if
    end for
    for each v in scc:
        for each w in V – scc such that <v, w> in E:
            w.incomingFromExternal :=
w.incomingFromExternal – 1
            sccw := The SCC w belongs to
            sccw.incomingFromExternalAggregated :=
sccw.incomingFromExternalAggregated – 1
            if sccw.incomingFromExternalAggregated =
0 and not mustNotBePruned(sccw):
                pruneSCC(sccw)
            end if
        end for
    end for
    remove scc from Gscc and (if necessary) from
RootContainer
end procedure
```

Another part of the code can assist with pruning. Given a set of vertices returned by a compiler's generate method, it can check whether there are more vertices in scc that may be pruned. ToBePrunedFull may be larger than DidNotNeedToBeGenerated if the compiler did not return all vertices that did not need to be generated for whatever reasons. It may also be larger if before some other SCC was pruned and this caused the incomingFromExternal count of some vertices in scc to go down.

```
Pseudocode 4 - determineFullSetOfVerticesToBePrunedFrom function determineFullSetOfVerticesToBePrunedFrom(scc,
DidNotNeedToBeGenerated): ToBePrunedFull //subset of V
    DoNotPruneBase := {v in scc –
DidNotNeedToBeGenerated | v.incomingFromExternal > 0 or v
is in StartSet}
    DoNotPrune := DoNotPruneBase
    for each v in DoNotPruneBase:
        Let G' := <scc – DidNotNeedToBeGenerated, E' >
be the subgraph of G that is induced by scc –
DidNotNeedToBeGenerated
        depthFirstSearch(v, G')
        for each w in scc – DidNotNeedToBeGenerated
that depthFirstSearch finds:
            put w into DoNotPrune
        end for
    end for
    return scc – DoNotPrune
end function
```

In practice, any number of other implementations can be supported.

Example 22

Example Computing Environment

Figure 10:
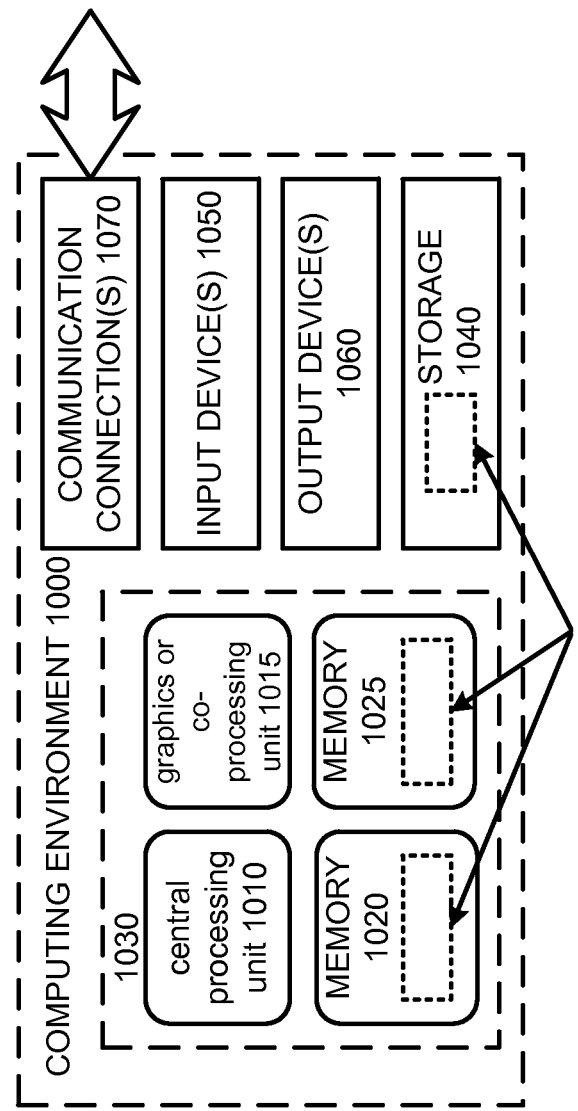
FIG. 10 depicts a generalized example of a suitable computing environment in which the described innovations may be implemented.

FIG. 10 depicts a generalized example of a suitable computing environment (e.g., computing system) 1000 in which the described innovations may be implemented. The computing environment 1000 is not intended to suggest any limitation as to scope of use or functionality, as the innovations may be implemented in diverse general-purpose or special-purpose computing systems. For example, the computing environment 1000 can be any of a variety of computing devices (e.g., desktop computer, laptop computer, server computer, tablet computer, etc.).

With reference to FIG. 10, the computing environment 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s).

A computing system may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing environment 1000. The storage 1040 stores instructions for the software 1080 implementing one or more innovations described herein. For example, the rules engine and others described herein can be the software 1080 executed from the memory 1020.

The input device(s) 1050 may be a touch input device such as a keyboard, mouse, pen, or trackball, a voice input device, a scanning device, or another device that provides input to the computing environment 1000. The output device(s) 1060 may be a display, printer, speaker, CD-writer, or another device that provides output from the computing environment 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although direct connection between computer systems is shown in some examples, in practice, components can be arbitrarily coupled via a network that coordinates communication.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or nonvolatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

Non-Transitory Computer-Readable Media

Any of the computer-readable media herein can be non-transitory (e.g., memory, magnetic storage, optical storage, solid-state drives, or the like).

Storing in Computer-Readable Media

Any of the storing actions described herein can be implemented by storing in one or more computer-readable media (e.g., computer-readable storage media or other tangible media).

Any of the things described as stored can be stored in one or more computer-readable media (e.g., computer-readable storage media or other tangible media).

Methods in Computer-Readable Media

Any of the methods described herein can be implemented by computer-executable instructions in (e.g., encoded on) one or more computer-readable media (e.g., computer-readable storage media or other tangible media). Such instructions can cause a computer to perform the method. The technologies described herein can be implemented in a variety of programming languages.

Methods in Computer-Readable Storage Devices

Any of the methods described herein can be implemented by computer-executable instructions stored in one or more computer-readable storage devices (e.g., memory, magnetic storage, optical storage, solid-state drives, or the like). Such instructions can cause a computer to perform the method.

Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

What is claimed is:

1. A method implemented at least in part by a computing system, the method comprising:
receiving a dependency graph representation of dependencies for source artifacts, wherein the source artifacts are represented in the dependency graph representation as source artifact nodes, and the source artifact nodes are grouped into strongly connected components associated with respective compilers appropriate for compiling the represented source artifacts therein;

receiving an indication that one or more of the source artifacts represented in the dependency graph representation are unnecessary to compile;
pruning one or more source artifact nodes in the dependency graph representation for the one or more of the source artifacts indicated as unnecessary to compile; and
after the pruning, updating the dependency graph representation;
wherein:
updating the dependency graph representation comprises:
identifying one or more strongly connected components of the dependency graph representation as isolated via pruning the one or more source artifact nodes in the dependency graph representation; and
with one or more processors, pruning the one or more strongly connected components of the dependency graph representation isolated via pruning the one or more source artifact nodes in the dependency graph representation.

2. The method of claim 1 further comprising:
as a result of pruning the one or more strongly connected components from the dependency graph representation isolated via pruning, omitting to compile the source artifacts represented by the pruned one or more strongly connected components.

3. The method of claim 1 further comprising:
performing intermediate pruning of the dependency graph representation after pruning the one or more source artifact nodes in the dependency graph representation;
wherein the intermediate pruning isolates the one or more strongly connected components.

4. The method of claim 1 wherein:
the dependency graph representation of dependencies for the source artifacts comprises at least one cycle at a node level.

5. The method of claim 4 wherein:
the dependency graph representation represents a plurality of strongly connected components as a directed acyclic graph.

6. The method of claim 5 wherein:
source artifacts represented by a given strongly connected component are compilable via a single compiler.

7. The method of claim 5 further comprising:
identifying a next set of source artifacts to compile via a topological sort of the strongly connected components; and
submitting the next set of source artifacts to a compiler for compilation.

8. The method of claim 7 wherein:
the indication that one or more of the source artifacts represented in the strongly connected components are unnecessary to compile is received from the compiler to which the next set of source artifacts is submitted for compilation.

9. The method of claim 1 wherein:
pruning the one or more source artifact nodes in the dependency graph representation comprises removing a proper subset of source artifact nodes in a strongly connected component comprising a plurality of source artifact nodes.

10. The method of claim 1 wherein:
identifying the one or more strongly connected components of the dependency graph representation as isolated comprises identifying a strongly connected component with no nodes having remaining edges incoming from external strongly connected components.

11. The method of claim 10 further comprising:
maintaining incoming from external edge counts for respective of the strongly connected components as an aggregated incoming from external count of nodes in a given strongly connected component.

12. The method of claim 1 further comprising:
submitting a first subset of the source artifacts associated with a first subset of the strongly connected components to a first compiler; and
submitting a second subset of the source artifacts associated with a second subset of the strongly connected components to a second compiler.

13. The method of claim 1 wherein:
a subset of the source artifacts is identified as a start set; and
source artifacts in the start set are compiled even if their corresponding nodes are pruned.

14. The method of claim 1 further comprising:
determining a next group of one or more strongly connected components to compile for a given compiler; and
submitting source artifacts for the next group to the given compiler.

15. A system comprising:
one or more processing units;
memory;
a graph representation of source artifacts, wherein the graph representation is divided into a plurality of strongly connected components associated with respective compilers, and one or more source artifact nodes of the graph representation are designated as members of a start set;
a pruning engine configured to receive an indication that one or more source artifacts represented in the graph representation are unnecessary to compile, wherein the pruning engine is configured to prune one or more source artifact nodes of the graph representation associated with the source artifacts that are unnecessary to compile and prune one or more strongly connected components isolated from the start set by having pruned the one or more source artifact nodes; and
an activation framework configured to examine the graph representation and determine a next group of strongly connected components to submit to a given compiler out of the compilers, wherein the activation framework avoids compilation of source artifacts associated with strongly connected components pruned by the pruning engine.

16. The system of claim 15 wherein:
the pruning engine is configured to avoid pruning for the source artifact nodes designated as members of the start set before source artifacts associated with the source artifact nodes are compiled.

17. The system of claim 15 further comprising:
for the source artifact nodes, a stored indication of a count of a number of edges incoming to a given source artifact node from an external strongly connected component.

18. The system of claim 15 further comprising:
for strongly connected components, a stored indication of a count of a number of unprocessed other strongly connected components having incoming edges directed to a given strongly connected component.

19. One or more computer-readable storage media comprising computer-executable instructions causing a computing system to perform a method comprising:
receiving a dependency graph representation of a plurality of source artifacts indicated as compilable by a given compiler out of a plurality of respective compilers;
separating the dependency graph representation into strongly connected components, wherein the strongly connected components are represented as a directed acyclic graph, and a given strongly connected component out of the strongly connected components comprises source artifact nodes representing source artifacts compilable by a single compiler;

based on a topological sort of the strongly connected components, choosing one or more of the strongly connected components to submit to a compiler out of the plurality of compilers;

receiving an indication that one or more of the source artifacts of the chosen one or more of the strongly connected components are unnecessary to compile;

pruning the source artifacts unnecessary to compile from the dependency graph representation;

based on pruning the source artifacts, identifying one or more isolated strongly connected components; and responsive to identifying the one or more isolated strongly connected components, pruning the one or more isolated strongly connected components from the dependency graph representation, whereby compilation of source artifacts associated with the one or more isolated strongly connected components is avoided.

* * * * *